United States Patent

Valletti et al.

[15] 3,667,316
[45] June 6, 1972

[54] FOOT PEDAL POSITIONING DEVICE

[72] Inventors: Rose Valletti; Angela Arone, both of 241 North Long Beach, Freeport, L. I., N.Y. 11520

[22] Filed: Mar. 11, 1971

[21] Appl. No.: 123,276

[52] U.S. Cl. ............................................................74/560
[51] Int. Cl. ..........................................................G05g 1/14
[58] Field of Search ..................74/564, 563, 562.5, 562, 561, 74/560

[56] References Cited

UNITED STATES PATENTS 520,072  5/1894  McKee ................................74/560 X
533,445  2/1895  Denison ..............................74/560 X Primary Examiner—William F. O'Dea
Assistant Examiner—F. D. Shoemaker
Attorney—Allison C. Collard

[57] ABSTRACT

A positioning device particularly adapted for foot pedal controls and the like consisting of a foot shaped platform for receiving a foot pedal control and including one or more heel stops which automatically position the user's heel in front of the foot pedal control. The platform also includes an anti-friction bottom surface such as foam rubber or suction cups which prevent the platform from becoming accidentally dislodged from its normal operating position.

6 Claims, 3 Drawing Figures

PATENTED JUN 6 1972 3,667,316

INVENTORS.
ROSE VALETTI
ANGELA ARONE
BY
ATTORNEY

3,667,316

FOOT PEDAL POSITIONING DEVICE

This invention relates to a foot pedal positioning device for mounting a foot pedal control to operate a machine and the like.

More specifically, this invention relates to a foot pedal positioning device having a platform for securing a foot pedal control and including positioning members for locating the person's foot, and a means for preventing the platform from sliding on a floor surface.

Foot pedal controls which are used to control electric machinery such as sewing machines, dictating machines and the like, often consist of foot operated switches built into metal castings and having a top surface which can be depressed by the user's foot to operate the machine. In many instances, such as on smooth floors, the foot pedal controls become dislocated from their normal operating positions after repeated use. Attempts to overcome this problem have consisted of permanently securing the foot pedals to the floor surface or weighting the foot pedal so as to prevent it from sliding on the floor surface. These attempts have not been successful since in many instances, the foot pedals cannot be secured to hard floor surfaces and often must be changed or moved as the machinery is relocated.

Accordingly, the present invention provides a foot pedal positioning device which not only aids the user in locating his foot with respect to the foot pedal control, but also provides a means for demountably securing the foot pedal to a floor surface. In the present invention, a platform is provided by which the foot pedal control is secured. Behind the foot pedal control is mounted one or more stops for receiving the heel of the user's foot so that the user can pivot his heel against the heel stop during normal operation of the foot pedal. Moreover, the positioning device of the invention includes, along the bottom surface of its platform, a slip resistant means consisting of a foam rubber pad or suction cup arrangement so as to prevent the platform from sliding on the floor surface.

It is therefore an object according to the present invention to provide a foot pedal positioning device which permits the user to automatically position his foot with respect to a foot pedal control.

It is another object according to the present invention to provide a foot pedal positioning device which permits the user to maintain the foot pedal control at a desired location adjacent to an operating machine.

It is still another object according to the present invention to provide a foot pedal control which is simple in design, inexpensive to manufacture, and reliable in operation.

Other objects and features of the present invention will become apparent from the following detailed description considered in connection with the accompanying drawing which discloses the embodiments of the invention. It is to be understood, however, that the drawing is designed for the purpose of illustration only and not as a definition of the limits of the invention.

In the drawing, wherein similar reference characters denote similar elements throughout the several views.

Figure 1:
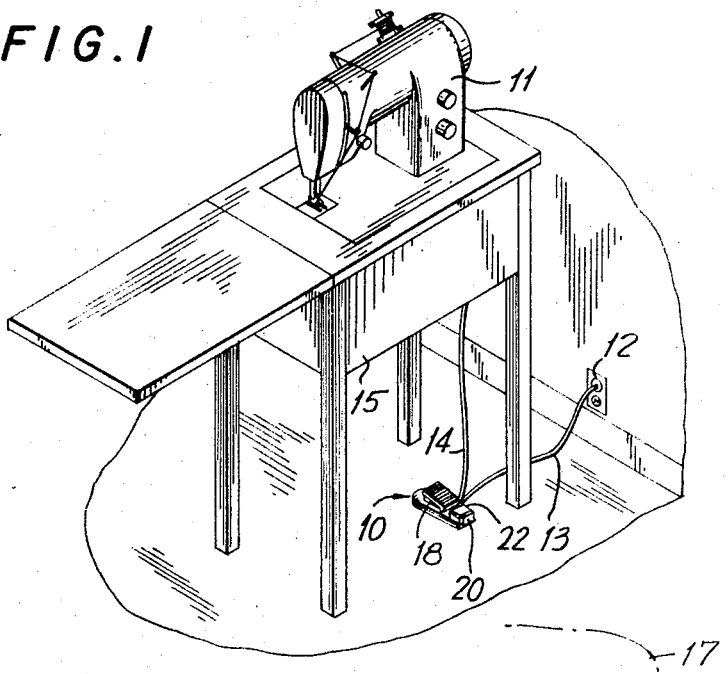
FIG. 1 is a perspective view of an operating machine, such as a sewing machine, having the foot pedal positioning device of the invention located below the machine.
Figure 2:
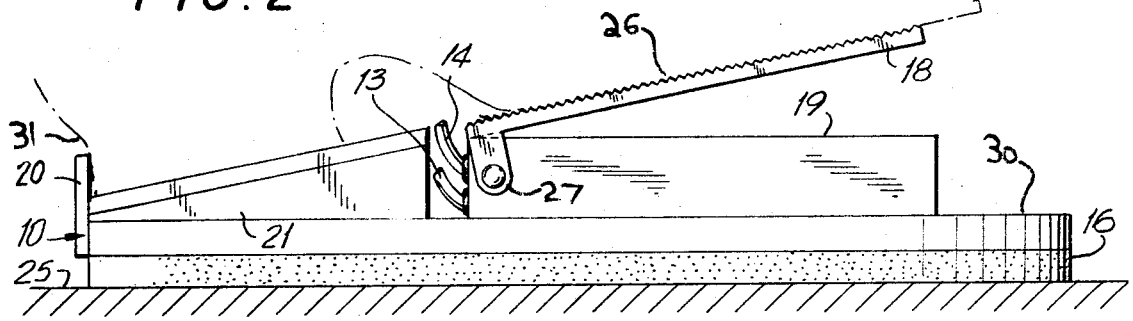
FIG. 2 is a side-view of the foot pedal positioning device of the present invention having a padded platform mounted on a flat floor surface.

Referring to FIGS. 1 and 2, there is shown the foot pedal positioning device 10 disposed on a floor surface 25 below an operating machine, such as a sewing machine 11. Machine 11 is customarily mounted on a table 15 and is connected by means of electrical cord 14 to positioning device 10. A second electrical cord 13 connects to plug 12 which provides power to machine 11. Positioning device 10 consists of a spring-loaded pedal 18 preferably having a roughened surface 26 for receiving the user's foot 17. Pedal 18 is pivoted on axis 27 to control box 19 which contains electrical control switches for coupling the power from conductor 13 through conductor 14 to machine 11. Mounted behind control box 19 on a footprint shaped platform 30 is an inclined heel supporting ramp 21. A heel stop 20, which is designed for engagement with the back part of the user's heel 31, closes the back end of ramp 21. Heel stop 20 projects vertically above the level of inclined ramp 21. Secured to the bottom of supporting platform 31 in the embodiment of FIG. 2 is a cushioning pad 16 which is preferably constructed of a rubber foam, impregnated with a latex cement which stays sticky or tacky after drying, so that pad 16 preferably becomes demountably secured to floor surface 25.

Figure 3:
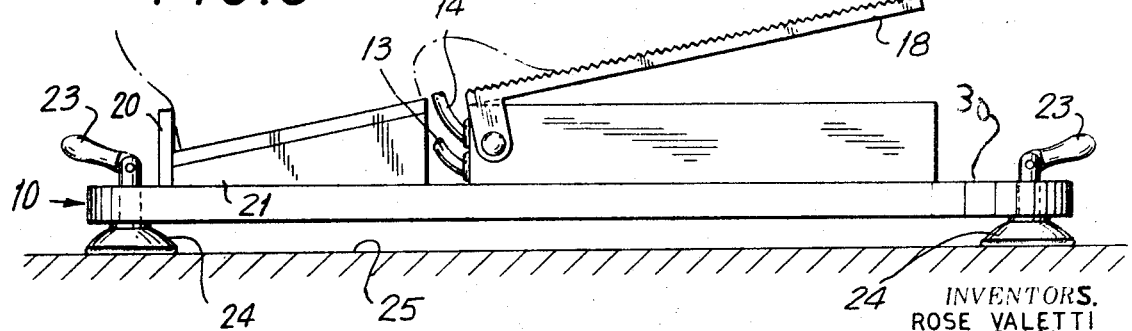
FIG. 3 is a side view of another embodiment of the foot pedal positioning device retained on the floor surface by means of suction cups.

Another embodiment of the invention is shown in detail in FIG. 3, whereby suction cups 24 are mounted on each end of the platform. Suction cups 24 include levers 23 which flatten the suction cups when bent into the position as shown in FIG. 3, so that the platform can become adhered to a smooth floor surface. In order to release the suction cups to move platform 30, the user need only move levers 23 into a vertical position with the toe of his foot and slide the platform to a new desirable position.

Platform 30, ramp 21 and stop 20 of the subject invention are preferably constructed of a rigid material, such as wood, metal or plastic, and pad 16 is preferably constructed of a foam rubber material impregnated with an adhesive which remains tacky or sticky over long periods of time.

While only a few embodiments of the present invention have been shown and described, it is obvious that many changes and modifications may be made thereunto without departing from the spirit and scope of the invention.

What is claimed is:

1. A foot pedal positioning device for demountably securing a foot pedal control to a flat surface comprising;
   a footprint shaped platform for supporting the foot pedal control on the front portion of its top surface,
   a heel receiving inclined ramp secured on the top surface of said platform adjacent to the foot pedal control,
   a heel stop secured on the end of said inclined ramp adjacent to the rear portion of said platform, and
   demountable securing means mounted on the bottom surface of said platform for demountably securing the platform to the flat surface.

2. The foot pedal positioning device as recited in claim 1, wherein said demountable securing means comprises a pad of foam rubber mounted on the bottom surface of the platform.

3. The foot pedal positioning device as recited in claim 2, wherein said foam rubber pad additionally comprises a latex cement impregnated in the foam rubber pad for maintaining a tacky surface in contact with the flat surface upon which the platform is to be mounted.

4. The foot pedal positioning device as recited in claim 1, wherein said demountable securing means comprises at least one suction cup mounted on the bottom surface of said platform for contact with the flat surface.

5. The foot pedal positioning device as recited in claim 4, wherein said suction cup additionally includes an activating lever mounted on the top surface of the platform for activating and deactivating the suction cup.

6. The foot pedal positioning device as recited in claim 1 additionally comprising a second heel stop mounted on the top surface of said platform adjacent to the foot pedal control and spaced apart from the first heel stop.

* * * * *